United States Patent
Sugiyama

(10) Patent No.: US 7,394,950 B2
(45) Date of Patent: Jul. 1, 2008

(54) OPTICAL MODULATOR

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/705,008

(22) Filed: Feb. 12, 2007

(65) Prior Publication Data

US 2008/0044124 A1 Feb. 21, 2008

(30) Foreign Application Priority Data

Aug. 21, 2006 (JP) ............................ 2006-224778

(51) Int. Cl.
*G02F 1/295* (2006.01)
(52) U.S. Cl. .................. 385/8; 385/1; 385/2; 385/3; 385/4; 385/9; 385/14; 385/39; 385/40; 385/129; 385/130; 385/131; 385/132
(58) Field of Classification Search .......... 385/2–4, 385/8, 9, 14, 40
See application file for complete search history.

(56) References Cited

U.S. PATENT DOCUMENTS

| 5,004,314 A * | 4/1991 | Booth et al. ............... 385/2 |
| 5,359,449 A * | 10/1994 | Nishimoto et al. ......... 398/198 |
| 6,449,080 B1 * | 9/2002 | McBrien et al. ........... 359/245 |
| 6,768,570 B2 | 7/2004 | Sugiyama et al. |
| 7,113,677 B2 * | 9/2006 | Doi et al. ................. 385/50 |
| 2004/0151414 A1 * | 8/2004 | Cheung et al. ............. 385/2 |
| 2004/0247225 A1 * | 12/2004 | Tavlykaev ................. 385/8 |

FOREIGN PATENT DOCUMENTS

| JP | 1-238623 | 9/1989 |
| JP | 2004-20780 | 1/2004 |
| JP | 2004-341045 | 12/2004 |
| JP | 2005-300905 | 10/2005 |

* cited by examiner

*Primary Examiner*—Brian Healy
*Assistant Examiner*—Hung Lam
(74) *Attorney, Agent, or Firm*—Staas & Halsey LLP

(57) ABSTRACT

An optical modulator of the Mach-Zehnder type including electrodes disposed above a substrate having a pair of linear portions of an optical waveguide includes a signal electrode to which modulating signals are applied; first and second earth electrodes; and a bias electrode to which a bias signal for controlling an operating point of the modulating signals is applied. The earth electrodes are disposed at either side of the signal electrode disposed above one of the linear portion, and the first earth electrode is disposed above the other linear portion. The bias electrode is disposed adjacent to the first earth electrode on a side opposite to the signal electrode. The bias electrode is disposed on a surface of the substrate, and a buffer layer is formed on the bias electrode. The first earth electrode has a ladder shape having the bias electrode interposed between the two long portions of the ladder.

13 Claims, 14 Drawing Sheets

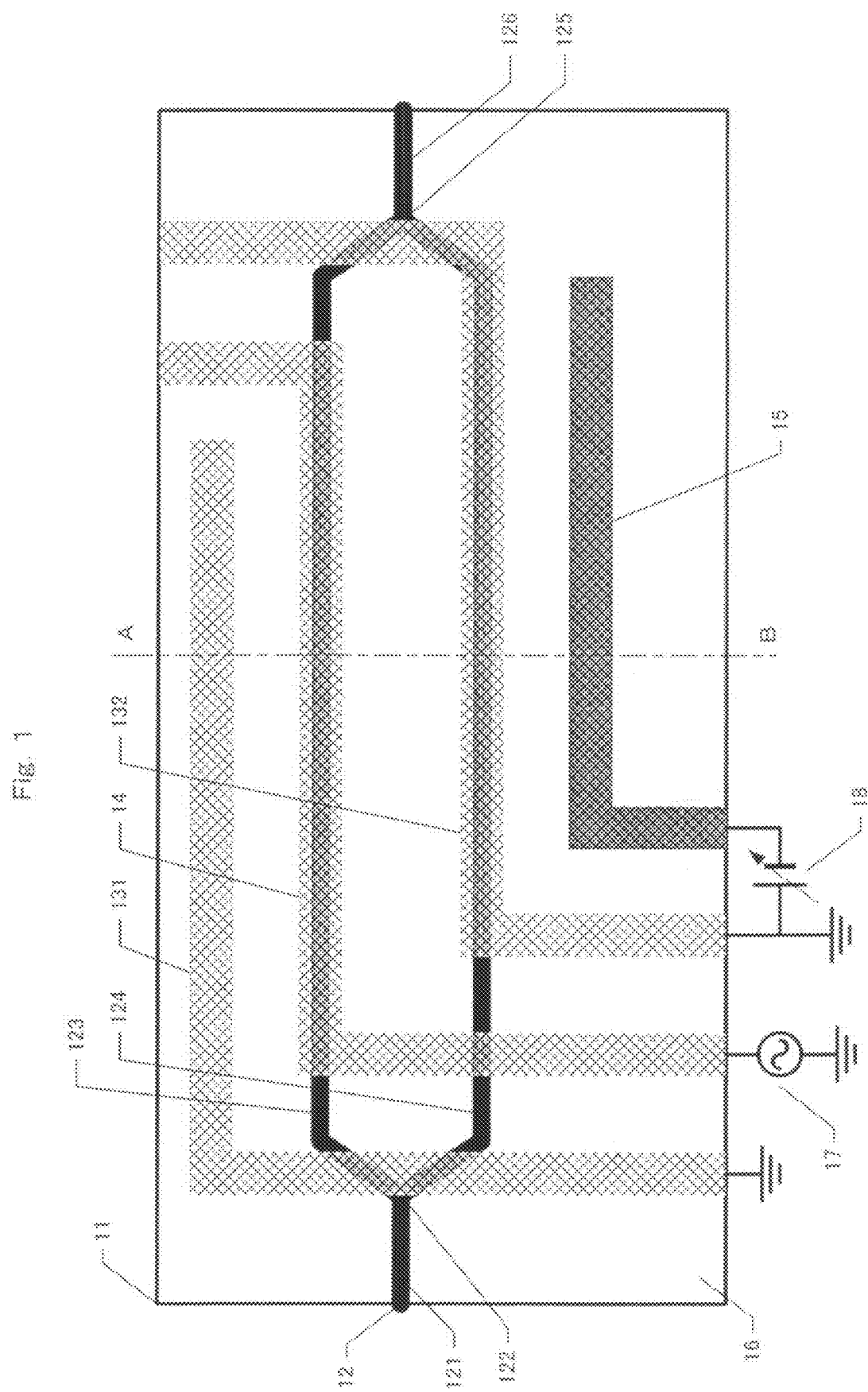

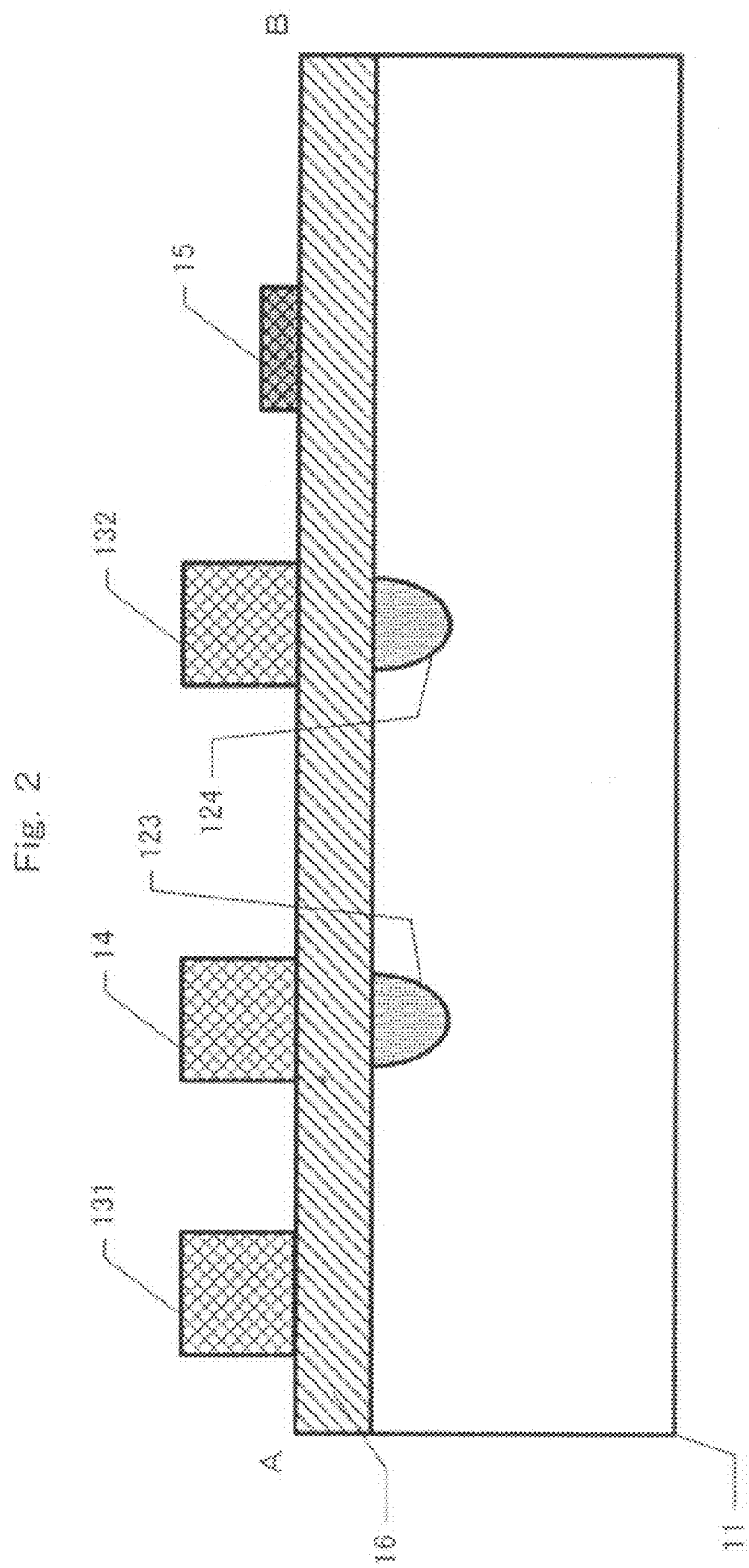

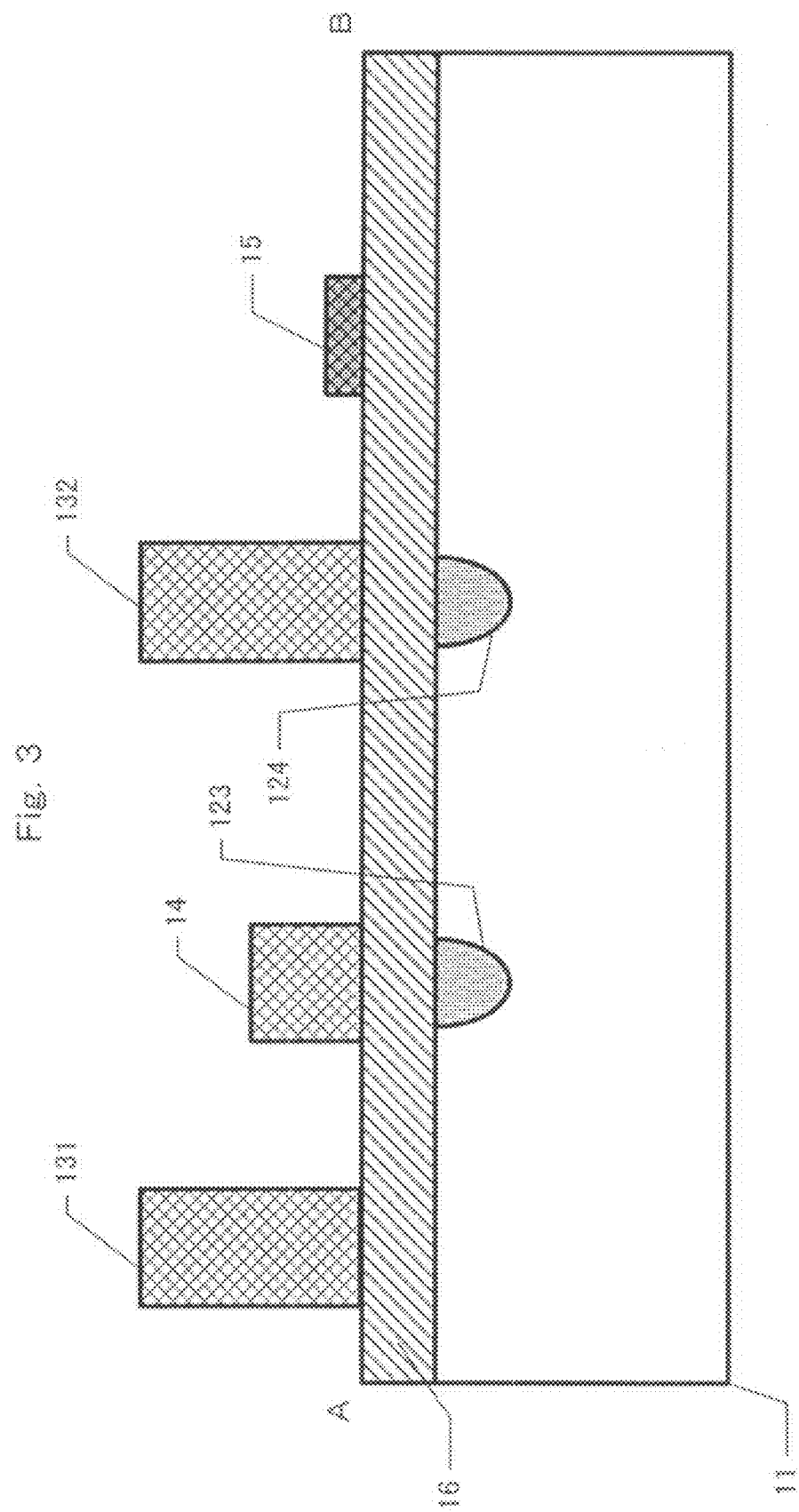

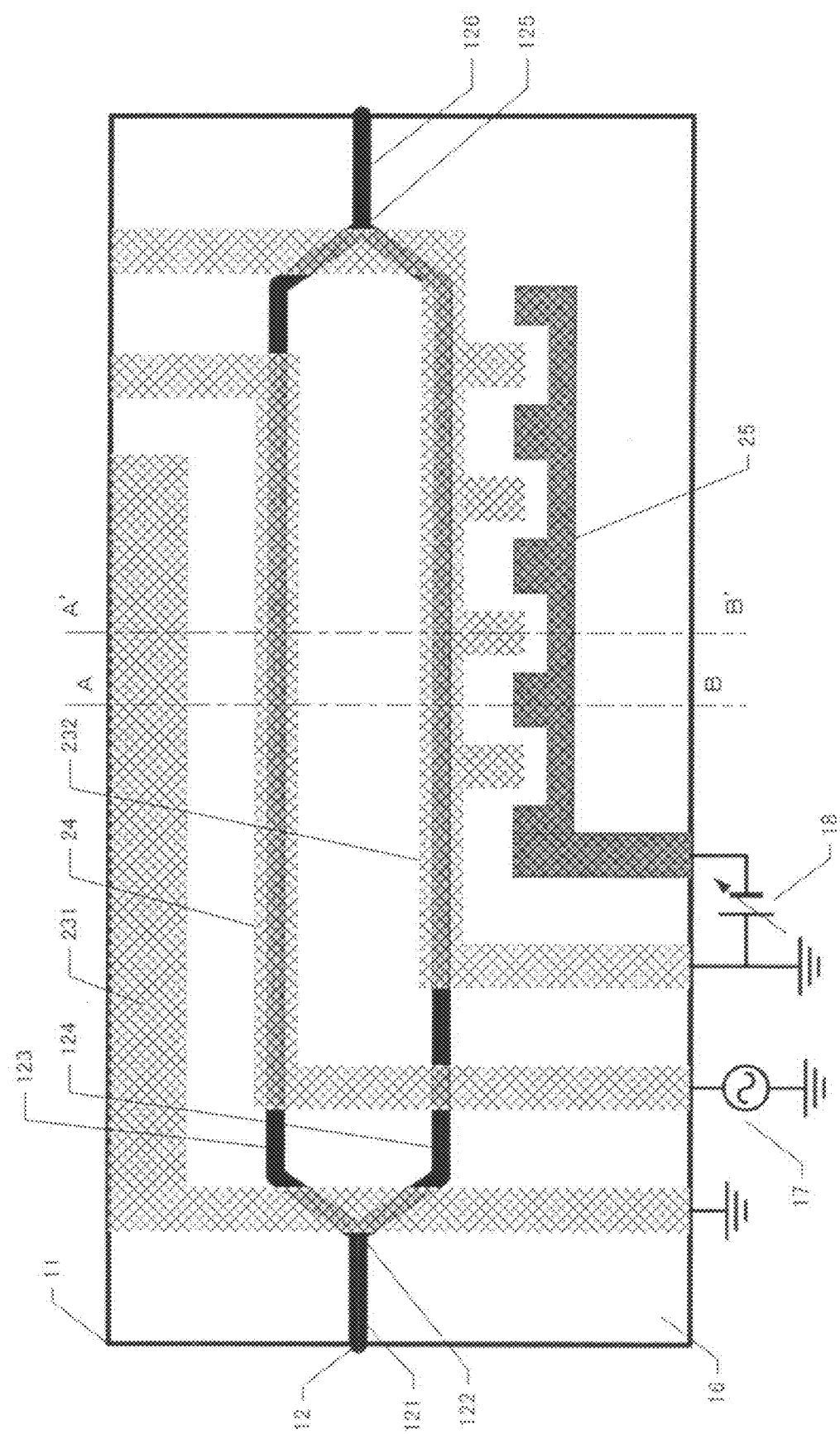

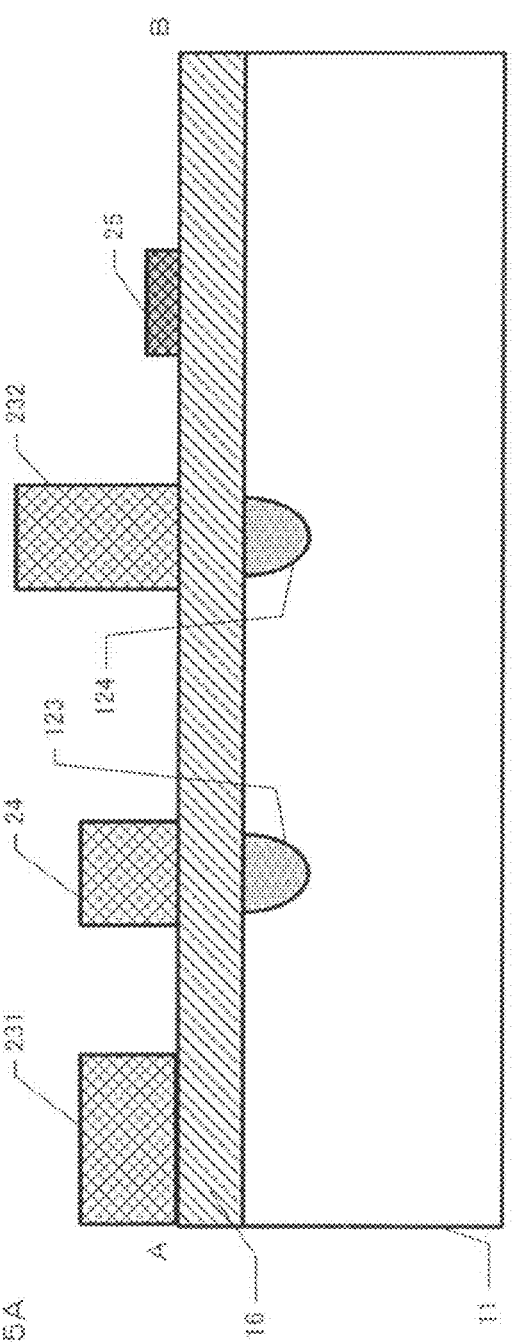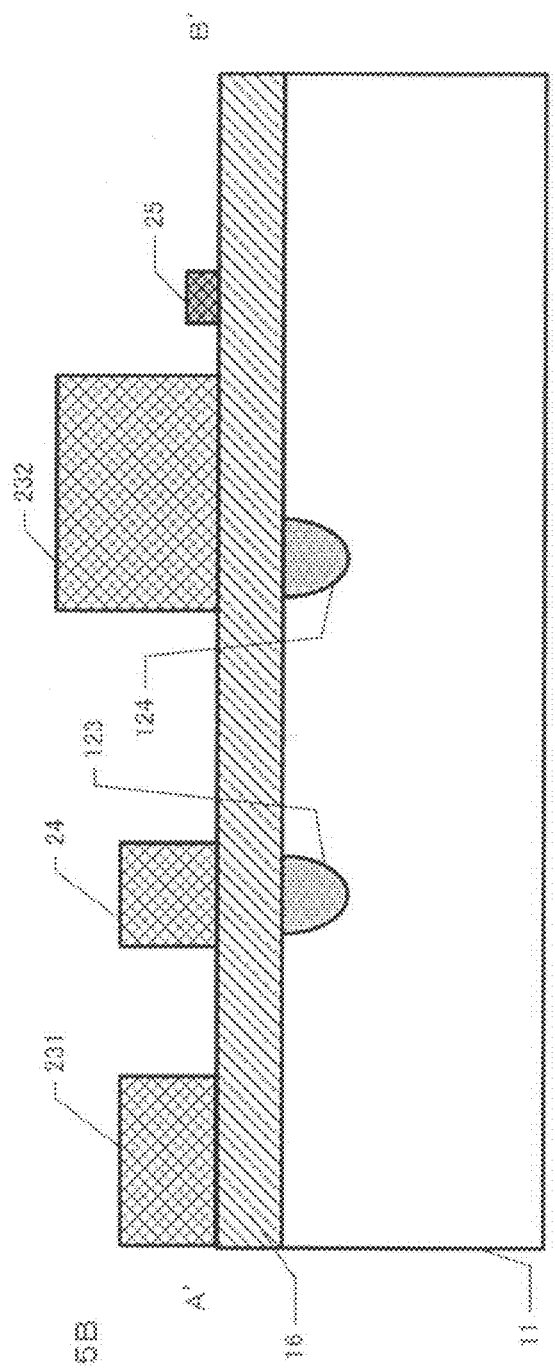

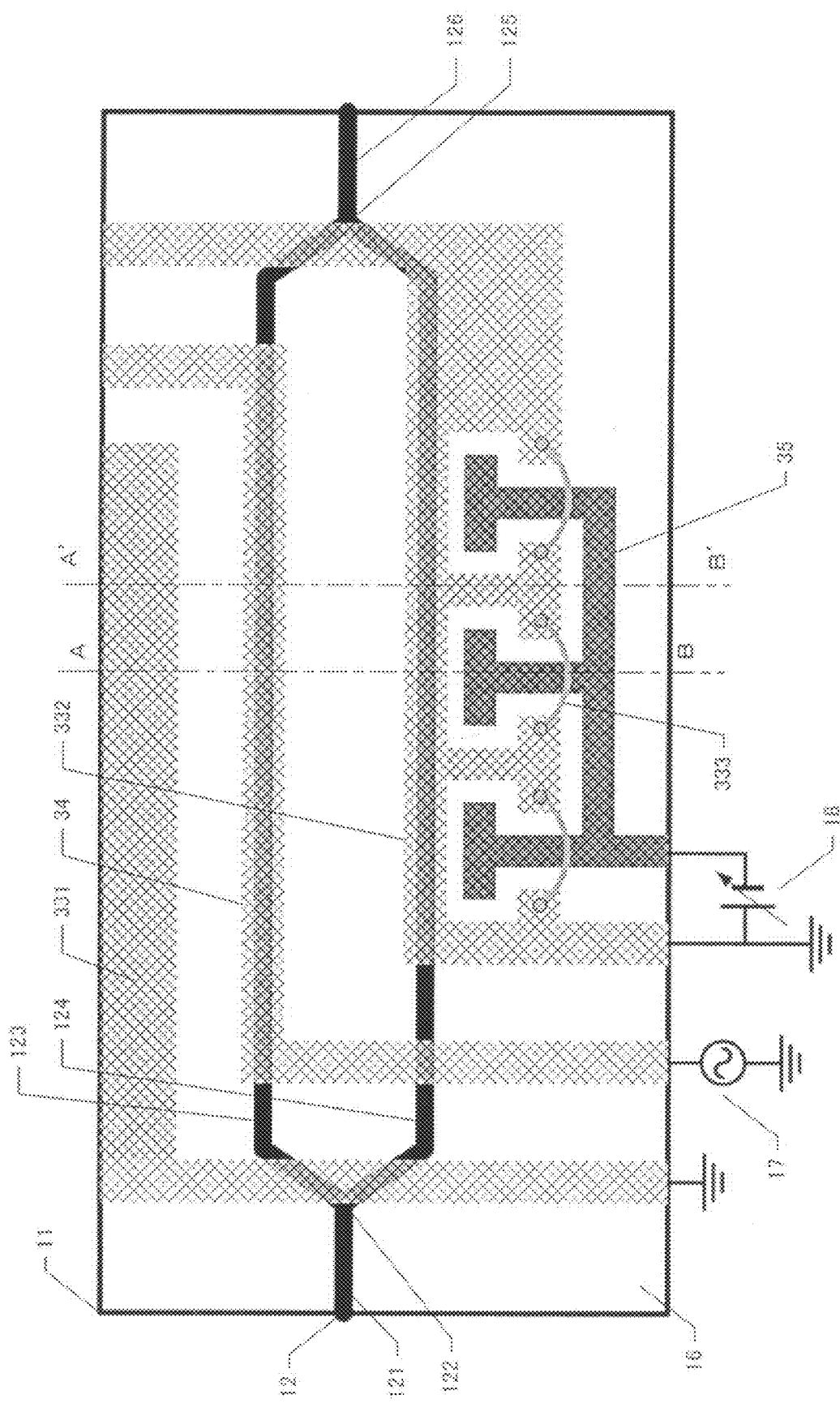

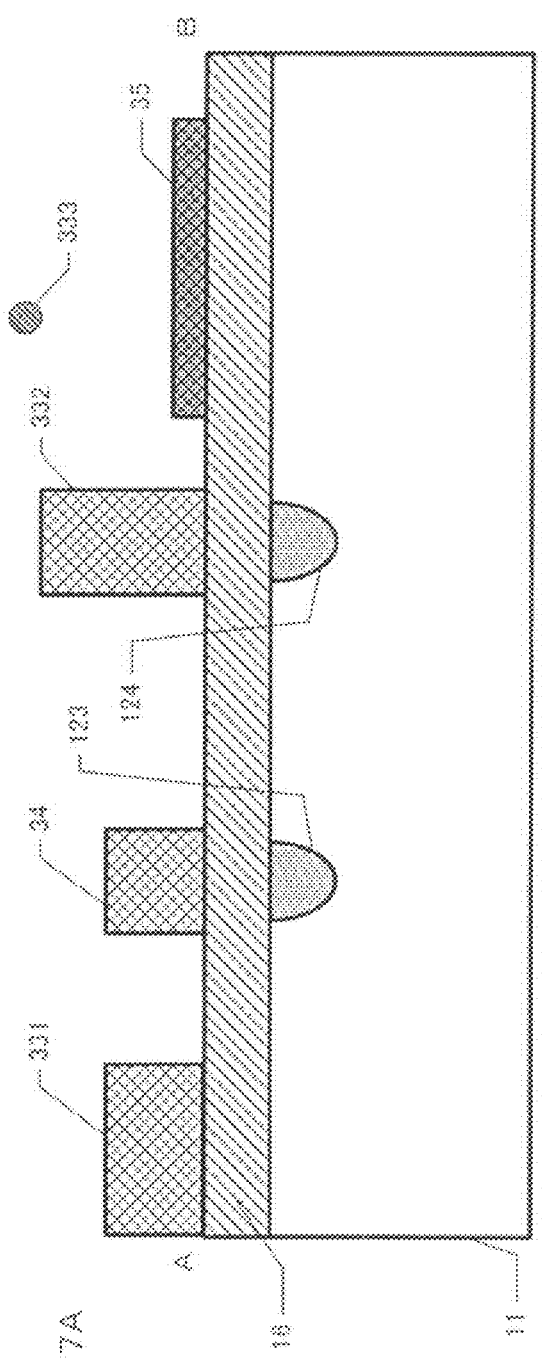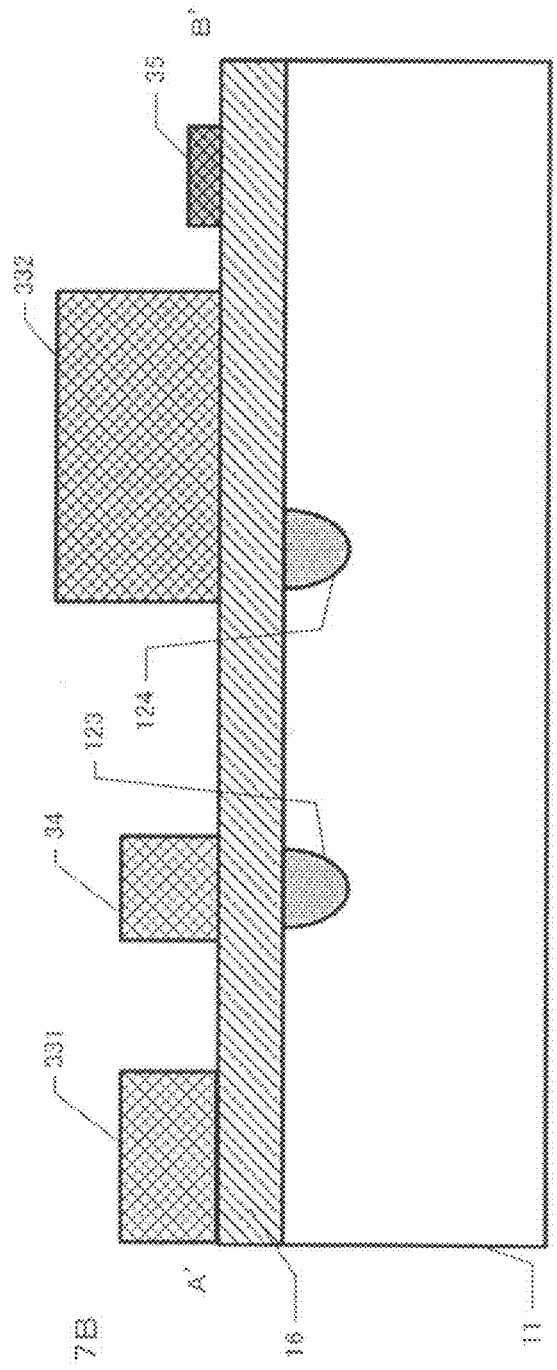

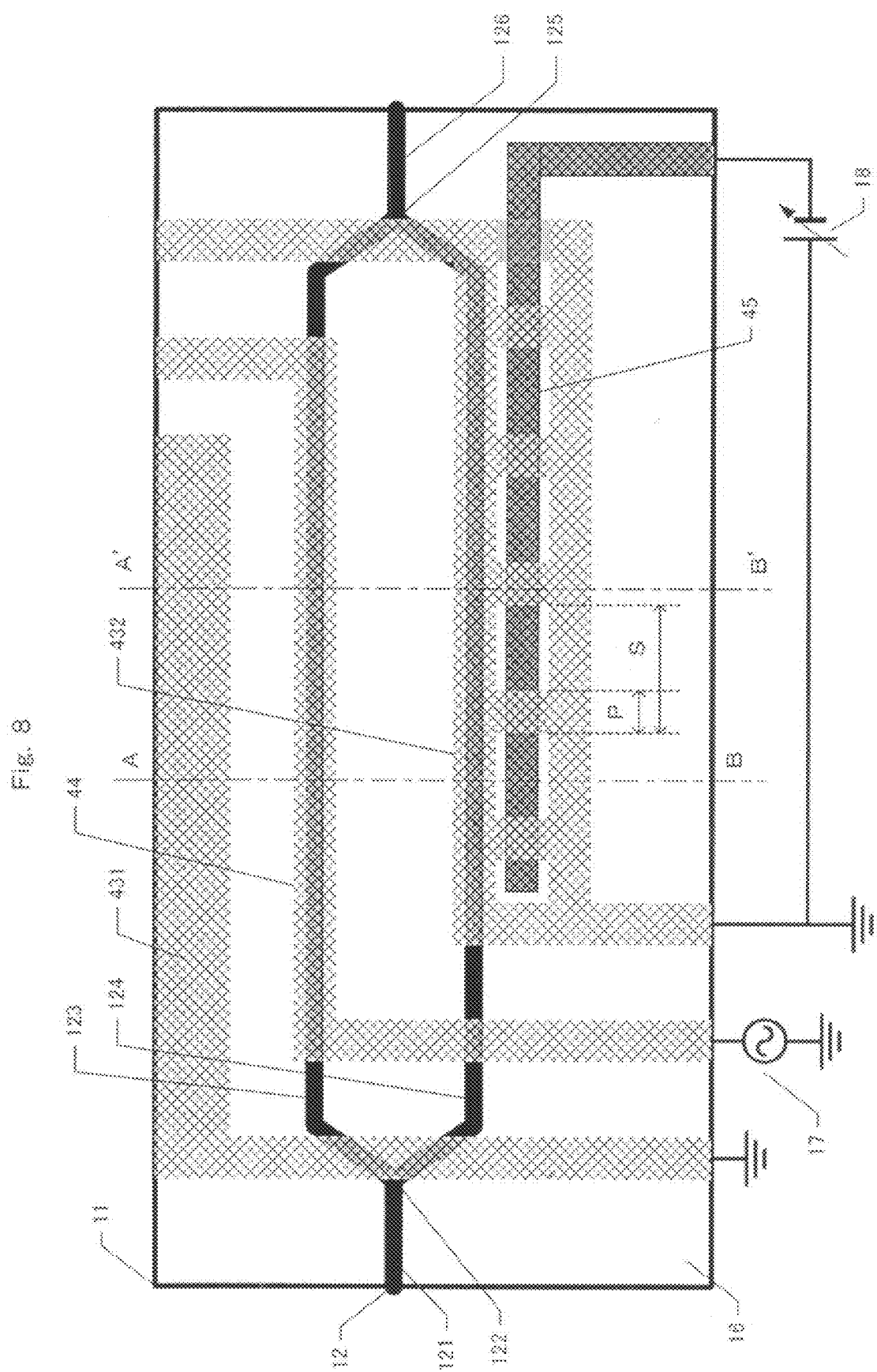

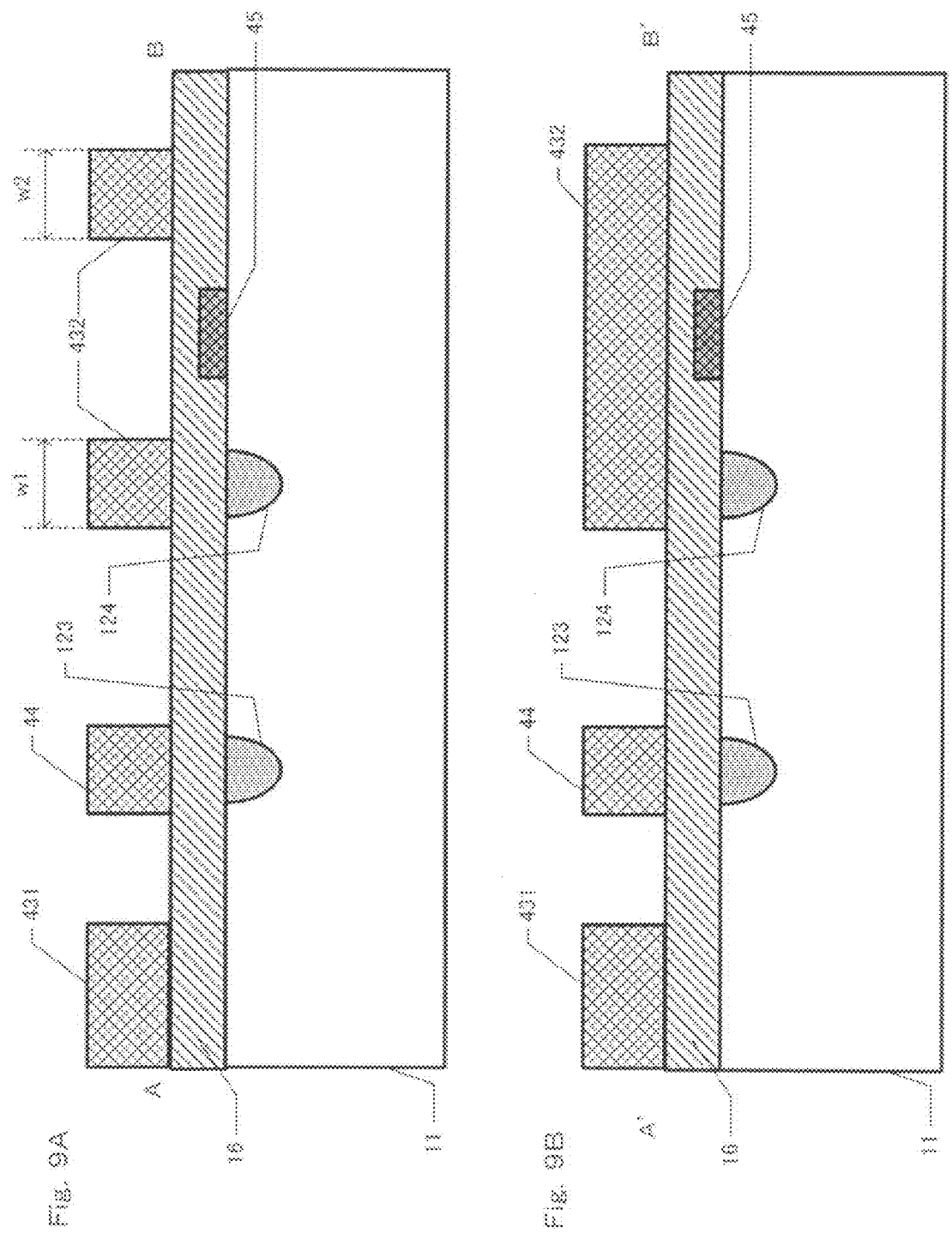

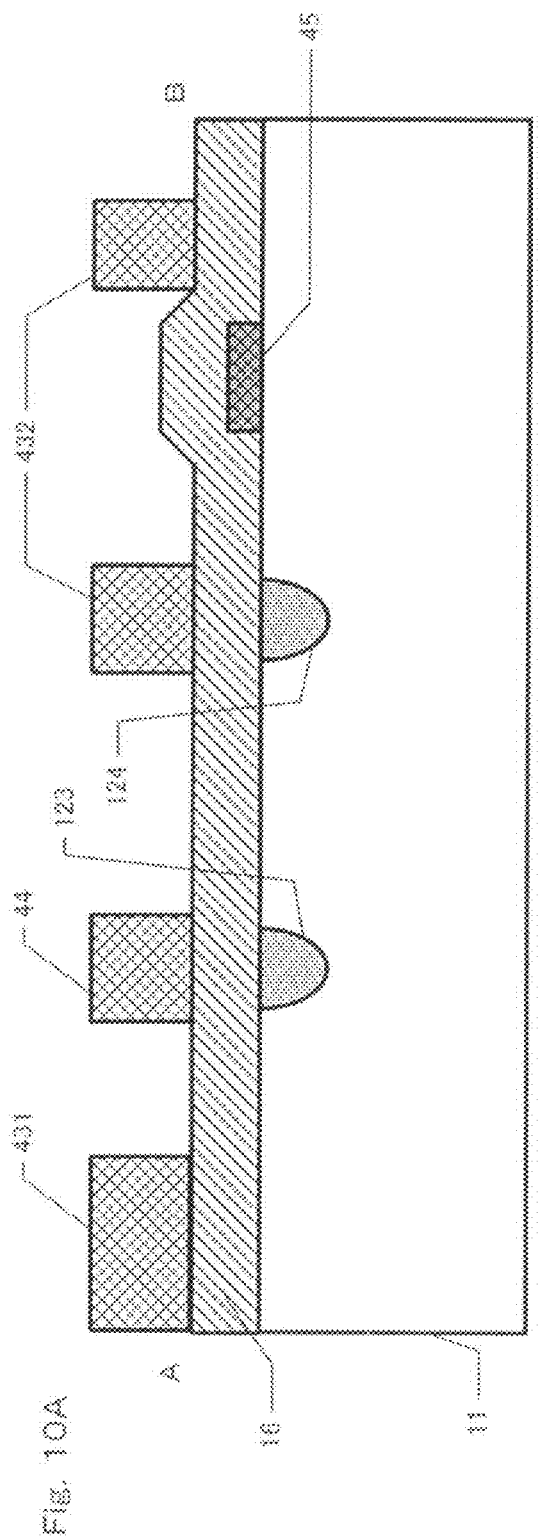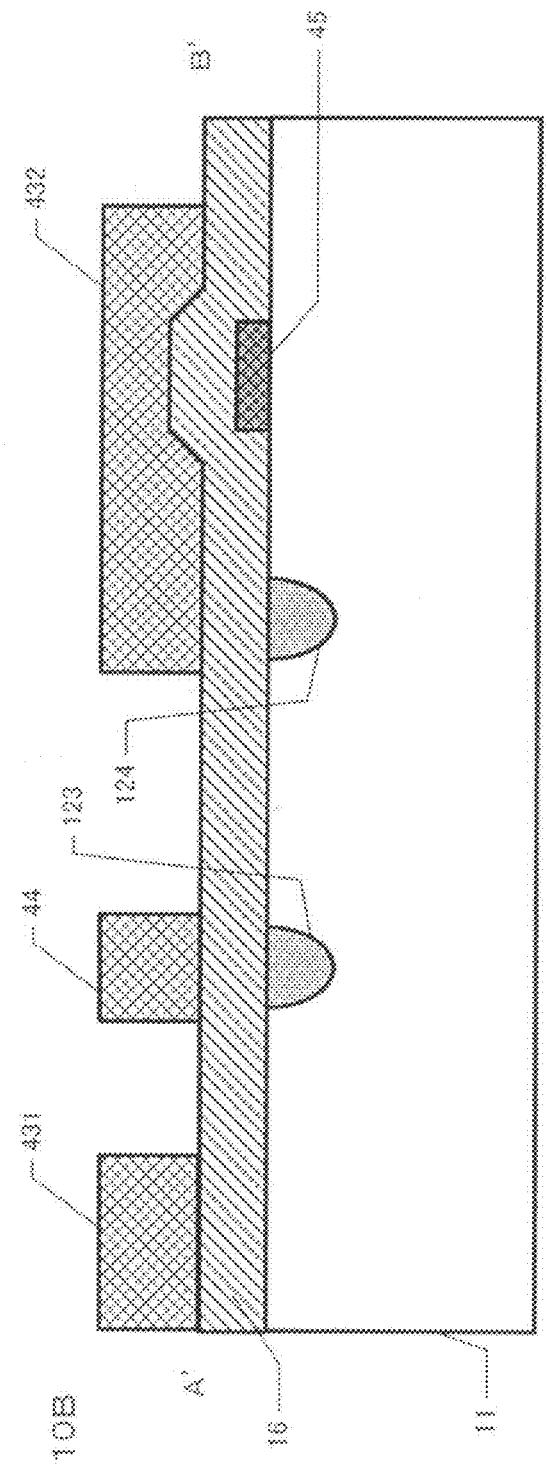

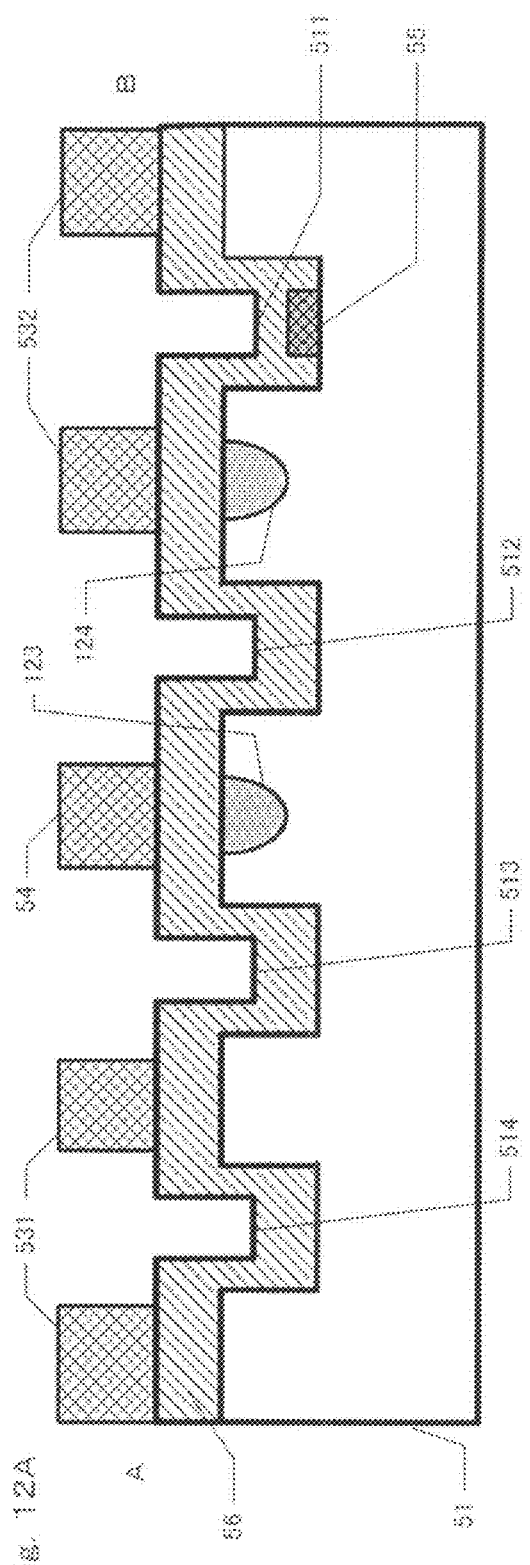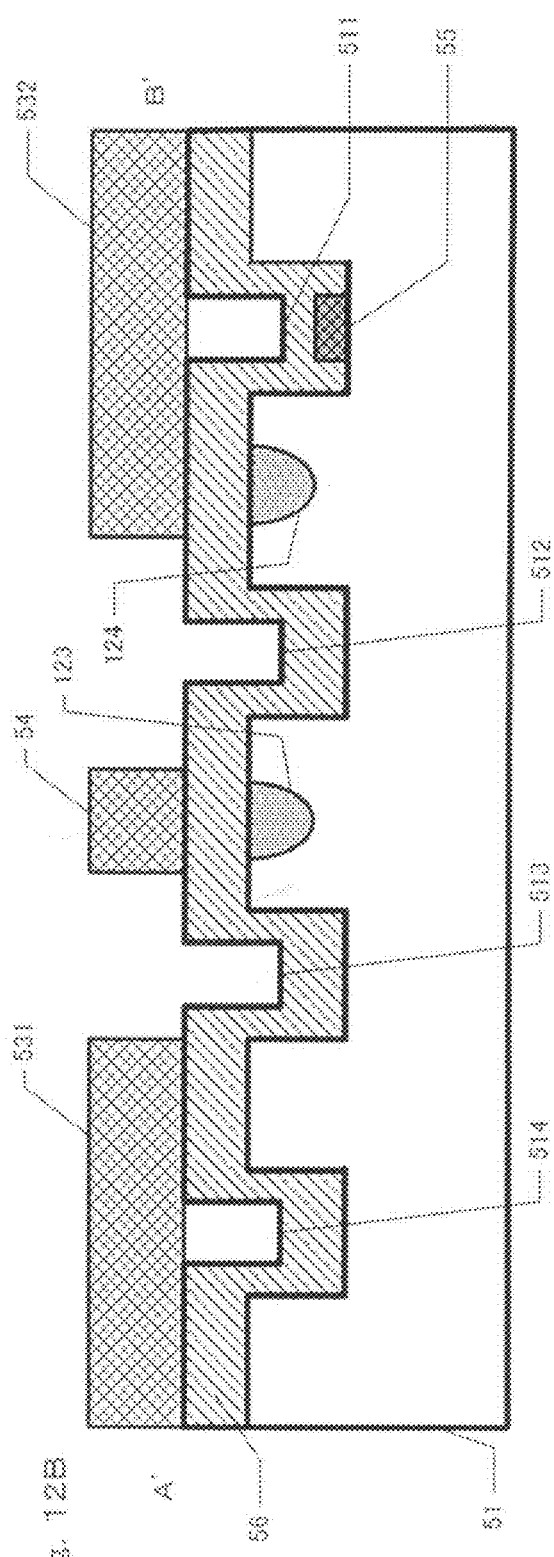

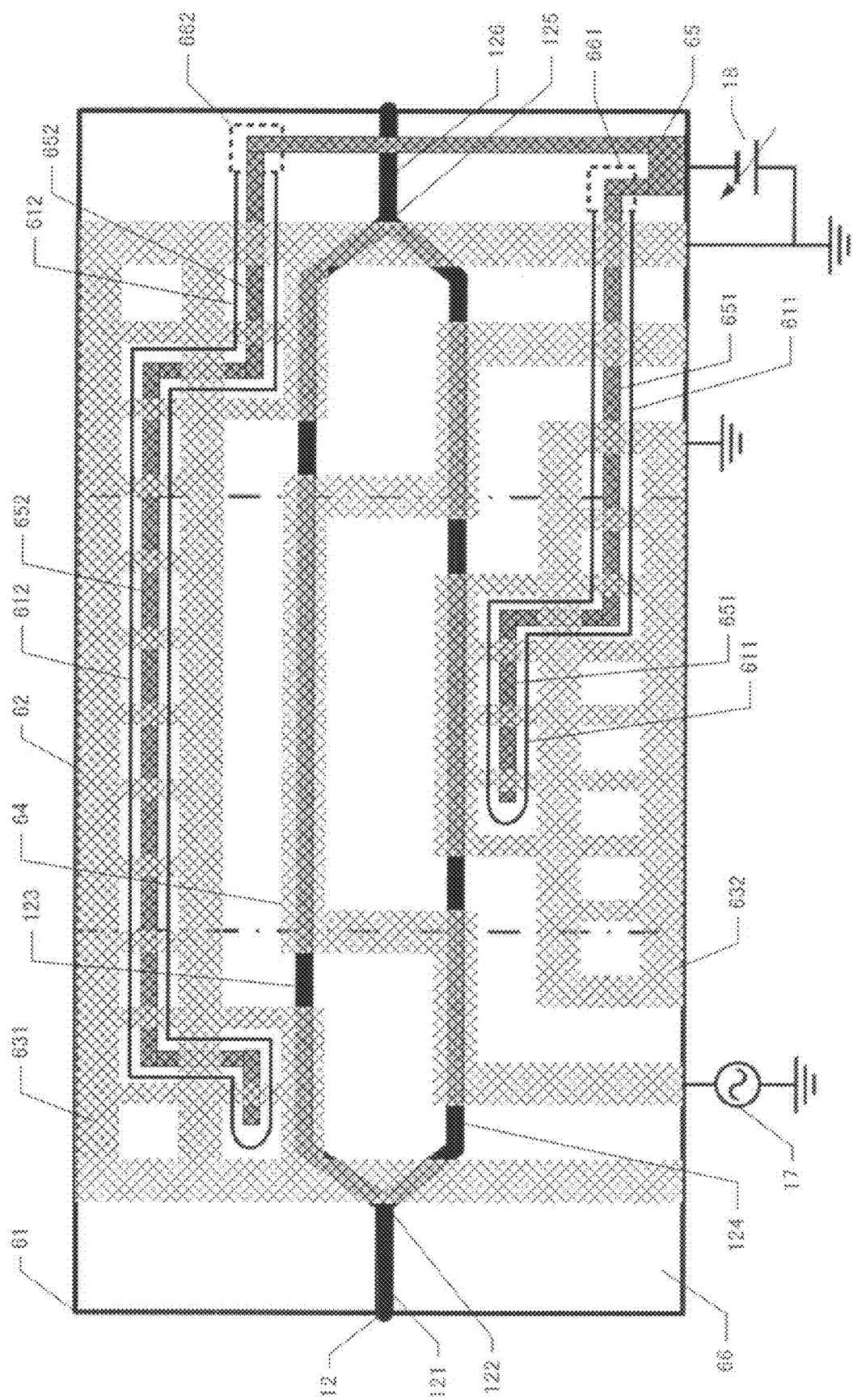

OPTICAL MODULATOR

BACKGROUND OF THE INVENTION

1. Field of the Invention

The present invention relates to optical modulators used in optical communication systems for modulating data signals from electrical signals into optical signals by controlling optical phases by means of an electro-optic effect.

2. Description of the Related Art

Recently, optical communication systems have progressed in various fields with the aim of faster communication, larger capacity, and size reduction. For optical transmitting devices, external modulators of the optical waveguide type using electro-optic crystals such as lithium niobate ($LiNbO_3$; hereinafter referred to as LN) substrates have been developed in view of wideband characteristics and chirp characteristics instead of direct modulation of laser diodes.

An example of such modulators is that including a Mach-Zehnder optical waveguide formed on an electro-optic crystal substrate composed of, for example, LN by thermal diffusion of a metal film composed of titanium (Ti) or the like partly formed on the LN crystal substrate or by proton exchange in a benzoic acid after the formation of a metal film. A buffer layer composed of silicon dioxide ($SiO_2$) or the like is formed on the substrate having the optical waveguide formed thereon. Furthermore, in a case of a Z-cut substrate where the LN material is cut along a direction parallel to the Z axis of the LN crystallographic axes, a signal electrode connected to a radio-frequency (RF) signal generating source that generates modulating signals is formed above one of a pair of linear portions of the Mach-Zehnder optical waveguide, and an earth electrode to which a ground potential is applied is formed above the other linear portion. In general, in the case of coplanar electrodes, the electrode structure is symmetrical about the signal electrode, and two earth electrodes are formed so as to have the signal electrode disposed between the earth electrodes. When signals are applied between the signal electrode and the earth electrodes, electric fields are generated in the optical waveguide, and the refractive index of the optical waveguide is changed. With this, the phase difference between light beams propagated through the pair of linear portions of the optical waveguide is changed. For example, when the phase difference is zero, the optical output is determined as logical level 1, whereas the optical output is determined as logical level 0 when the phase difference is $\pi$.

In order to realize such modulation, a direct current can be superposed on the high-speed RF signals using a bias T such that an operating point of the RF signals (DC bias component) applied to the signal electrode is controlled. However, this leads to an increase in operational costs or the like. Moreover, it is difficult to apply the bias T to an optical modulator driven with signals of 10 GHz or higher due to limitation of the frequency band caused by the bias T. In order to solve this problem, an optical modulator disclosed in Japanese Unexamined Patent Application Publication No. 2003-233042 includes a bias electrode for applying a bias voltage so as to control an operating point of RF signals (DC bias component) applied to signal electrodes. The signal electrodes are disposed above parts of linear portions of the Mach-Zehnder optical waveguide, and the bias electrode is disposed above other parts of the linear portions.

However, according to the above-described structure, the chip length of the optical modulator becomes long since the bias electrode is disposed downstream of the signal electrodes in a direction along which light beams travel in the optical waveguide. In order to solve this problem, an optical modulator having a bias electrode disposed adjacent and parallel to a signal electrode is disclosed in Japanese Unexamined Patent Application Publication No. 10-54961. However, according to the structure of this optical modulator, the bias electrode may be shorted with the earth electrode.

SUMMARY OF THE INVENTION

As described above, the structure including a signal electrode and a bias electrode is effective for an optical modulator that drives high-speed signals.

It is an object of the present invention to provide an optical modulator capable of preventing short-circuit between a bias electrode and an earth electrode, which may be caused by size reduction, and ensuring high-frequency transmission characteristics.

According to a first aspect of the present invention, the optical modulator of Mach-Zehnder type comprising: electrodes disposed above a substrate on which a pair of optical waveguide is formed; wherein the electrodes comprises a signal electrode to which modulation signals, for modulating light propagated over the optical waveguides, are applied; first and second earth electrodes to which a ground potential is applied; and a bias electrode to which a bias signal, for controlling an operation point for the modulation signals, is applied, wherein the signal electrode is disposed above the one of the pair of optical waveguides; the first and second earth electrodes are disposed at either side of the signal electrode, and the first earth electrode is disposed above the other of the pair of optical waveguides; the bias electrode is disposed adjacent to the first earth electrode on the opposite side of the signal electrode disposed; and the thickness of the first earth electrode is larger than the thickness of the signal electrode.

According to the first aspect of the present invention, the electrodes are not located above the bias electrode. Therefore, short-circuits between the bias electrode and the earth electrodes can be regulated. Moreover, high-frequency transmission characteristic can be ensured by increasing the thickness of the first earth electrode.

According to a second aspect of the present invention, the optical modulator of Mach-Zehnder type comprising: electrodes disposed above a substrate on which a pair of optical waveguide is formed; wherein the electrodes comprises a signal electrode to which modulation signals, for modulating light propagated over the optical waveguides, are applied; first and second earth electrodes to which a ground potential is applied; and a bias electrode to which a bias signal, for controlling an operation point for the modulation signals, is applied, wherein the signal electrode is disposed above the one of the pair of optical waveguides; the first and second earth electrodes are disposed at either side of the signal electrode, and the first earth electrode is disposed above the other of the pair of optical waveguides; the bias electrode is disposed adjacent to the first earth electrode on the opposite side of the signal electrode disposed; the bias electrode is disposed on a surface of the substrate; and the first earth electrode is disposed on a buffer layer formed on the surface of the substrate, and is shaped into a ladder, wherein crosspiece portions of the ladder are above the bias electrode.

According to the second aspect of the present invention, the buffer layer is formed on the bias electrode, and the ladder-shaped earth electrode is disposed on the buffer layer. Thus, short-circuit between the bias electrode and the first earth electrode can be regulated. Moreover, the contact area between the first earth electrode and the buffer layer is increased due to the ladder shape of the first earth electrode, thereby ensuring high-frequency transmission characteristics.

The optical modulator according to the present invention can prevent short-circuit between the earth electrode disposed above one of the pair of linear portions of the optical waveguide and the bias electrode disposed adjacent to the earth electrode. Moreover, the optical modulator according to the present invention can ensure high-frequency transmission characteristics by increasing the thickness of the earth electrode or by increasing the contact area between the earth electrode and the buffer layer.

BRIEF DESCRIPTION OF THE DRAWINGS

FIG. 1 illustrates an optical modulator according to an embodiment of the present invention;

FIG. 2 is a cross-sectional view of the optical modulator shown in FIG. 1;

FIG. 3 is a cross-sectional view of the optical modulator shown in FIG. 1;

FIG. 4 illustrates an optical modulator according to another embodiment of the present invention;

FIGS. 5A and 5B are cross-sectional views of the optical modulator shown in FIG. 4;

FIG. 6 illustrates an optical modulator according to another embodiment of the present invention;

FIGS. 7A and 7B are cross-sectional views of the optical modulator shown in FIG. 6;

FIG. 8 illustrates an optical modulator according to another embodiment of the present invention;

FIGS. 9A and 9B are cross-sectional views of the optical modulator shown in FIG. 8;

FIGS. 10A and 10B are cross-sectional views of the optical modulator shown in FIG. 8;

FIGS. 12A and 12B are cross-sectional views of the optical modulator shown in FIG. 11;

FIG. 13 illustrates an optical modulator according to another embodiment of the present invention.

DESCRIPTION OF THE PREFERRED EMBODIMENTS

Figure 11:
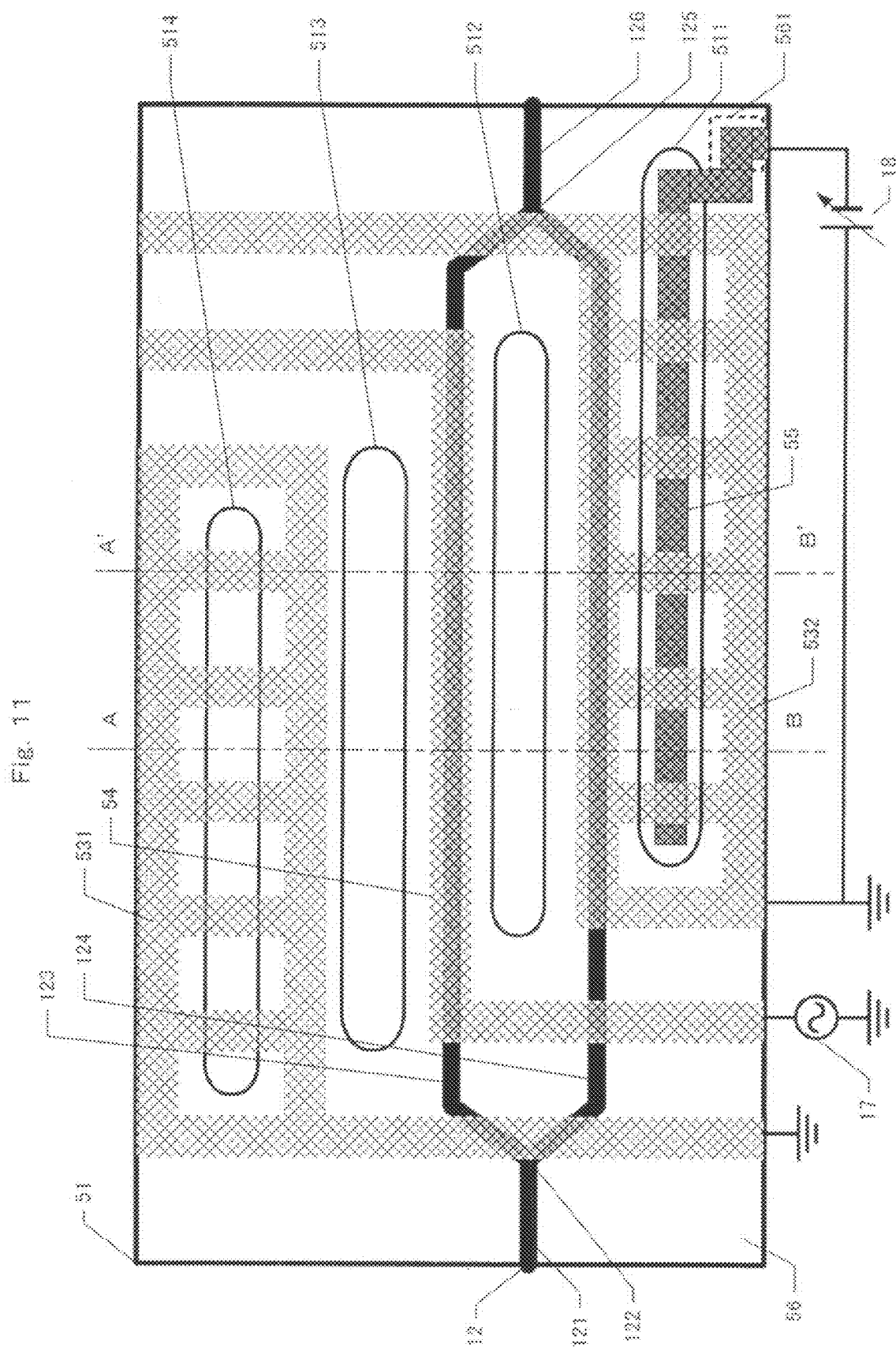
FIG. 11 illustrates an optical modulator according to another embodiment of the present invention.

Embodiments of the present invention will now be described in detail with reference to the drawings. The same reference numbers are used for the same or similar components in the drawings.

First Embodiment

FIG. 1 illustrates an optical modulator according to an embodiment of the present invention. For example, a substrate (Z-cut substrate) 11 is cut from a LN material along a direction parallel to the Z axis of the LN crystallographic axes, and an optical waveguide 12 is formed on the substrate 11 by thermal diffusion of a metal film composed of Ti or the like formed on the substrate 11. The Z-cut substrate 11 has a crystallographic axis enabling an efficient change in refractive index in a direction perpendicular to the surface thereof by means of an electro-optic effect. The optical waveguide 12 is of the Mach-Zehnder type including an entrance portion 121 to which light beams are input, a Y-shaped branch portion 122 for branching the light beams, parallel linear portions 123 and 124 that propagate the branched light beams, a Y-shaped branch portion 125 for multiplexing the light beams propagated through the linear portions 123 and 124, and an exit portion 126 from which the light beams are output.

A buffer layer 16, which has a thickness of 0.2 to 1 μm in general, is formed on the entire surface of the substrate 11 having the optical waveguide 12 formed thereon.

A signal electrode 14 is formed on the buffer layer 16 above the linear portion 123, and an earth electrode 132 is formed on the buffer layer 16 above the linear portion 124. An earth electrode 131 is formed so as to be symmetrical to the earth electrode 132 about the signal electrode 14. Moreover, a bias electrode 15 is formed adjacent to the earth electrode 132 on a side of the earth electrode 132 opposite that on which the signal electrode 14 is formed.

The signal electrode 14 is connected to an RF signal source 17 that generates modulating signals. The bias electrode 15 is connected to a power source 18, and controls the phases of the light beams propagated through the linear portions 123 and 124 by controlling an operating point (DC bias voltage) of the modulating signals generated by the RF signal source 17.

A ground potential is applied to the earth electrodes 131 and 132.

FIG. 2 is a cross-sectional view of the optical modulator taken along line A-B in FIG. 1.

For example, the substrate 11 is cut from an LN material having an electro-optic effect in the direction parallel to the Z axis of the LN crystallographic axes, and the pair of linear portions 123 and 124 of the Mach-Zehnder optical waveguide is formed on the substrate 11. The buffer layer 16 is disposed on the substrate 11 having the linear portions 123 and 124 formed thereon.

The signal electrode 14 is formed above the linear portion 123, and the earth electrode 132 is formed above the linear portion 124. The earth electrode 131 is formed so as to be symmetrical to the earth electrode 132 about the signal electrode 14. Moreover, the bias electrode 15 is formed adjacent to the earth electrode 132 on a side of the earth electrode 132 opposite that on which the signal electrode 14 is formed.

The electric field generated between the linear portions 123 and 124 is determined from the potential of the modulating signals applied by the signal electrode 14 with respect to the ground potential applied by the earth electrodes 131 and 132. Moreover, a DC potential is applied to the electric field generated at the linear portion 124 by the bias electrode 15. Therefore, the operating point of the modulating signals (DC bias voltage) can be controlled by adjusting the bias voltage applied to the bias electrode 15.

According to this embodiment, the signal electrode and the bias electrode can be formed in a direction perpendicular to the extending direction of the pair of linear portions of the optical waveguide. Thus, the optical modulator can be reduced in size, and short-circuit between the signal electrode and the bias electrode can be regulated.

Second Embodiment

FIG. 3 is a cross-sectional view of the optical modulator taken along line A-B in FIG. 1.

Compared with the optical modulator according to the first embodiment, the optical modulator shown in FIG. 3 has earth electrodes 131 and 132 whose thickness is larger than that of a signal electrode 14.

According to this embodiment, the cross-sectional areas of the earth electrodes are increased due to an increase in the thickness of the earth electrodes compared with those in the first embodiment. With this, the grounding resistance of the optical modulator is reduced, and high-frequency noise of the optical modulator in the ground potential can easily be propagated to the exterior via the earth electrodes. Thus, high-frequency transmission characteristics can be ensured.

Third Embodiment

FIG. 4 illustrates an optical modulator according to an embodiment of the present invention.

FIGS. 5A and 5B are cross-sectional views of the optical modulator taken along line A-B in FIG. 4 and taken along line A'-B' in FIG. 4, respectively.

The optical modulator shown in FIGS. 4, 5A, and 5B has earth electrodes 231 and 232 and a bias electrode 25 that are different from those in the first embodiment.

For example, the thickness of the earth electrode 232 is larger than that of a signal electrode 24. When a force in the thickness direction is applied to the earth electrode 232, the earth electrode 232 may collapse and be shorted with the bias electrode 25. In order to prevent the short-circuit between the earth electrode 232 and the bias electrode 25, a plurality of protrusions extending toward the bias electrode 25 are provided for the earth electrode 232. The protrusions can also increase the contact area between the earth electrode 232 and a buffer layer.

The bias electrode 25 partly protrudes to areas between the protrusions of the earth electrode 232.

Moreover, since the contact area between the earth electrode 232 and the buffer layer is increased due to the protrusions, the contact area between the earth electrode 231 and the buffer layer is also increased such that the earth electrode 231 becomes symmetrical to the earth electrode 232 about the signal electrode 24.

The cross-sectional view shown in FIG. 5A illustrates a portion where the earth electrode 232 does not have a protrusion (a position between two adjacent protrusions), and the bias electrode 25 partly protrudes to the earth electrode 232.

The cross-sectional view shown in FIG. 5B illustrates a portion where the earth electrode 232 has a protrusion.

Fourth Embodiment

FIG. 6 illustrates an optical modulator according to an embodiment of the present invention.

FIGS. 7A and 7B are cross-sectional views of the optical modulator taken along line A-B in FIG. 6 and taken along line A'-B' in FIG. 6, respectively.

The optical modulator shown in FIGS. 6, 7A, and 7B has an earth electrode 332 and a bias electrode 35 that are different from those in the third embodiment shown in FIG. 4.

Two adjacent protrusions of the earth electrode 332 are connected to each other using metal wires 333.

The cross-sectional view shown in FIG. 7A illustrates a portion where the earth electrode 332 does not have a protrusion (a position between two adjacent protrusions), and the bias electrode 35 partly protrudes to the earth electrode 332. The metal wires 333 connect the protrusions above the bias electrode 35.

The cross-sectional view shown in FIG. 7B illustrates a portion where the earth electrode 332 has a protrusion.

According to the third and fourth embodiments, the short-circuits between the earth electrode 232 and the bias electrode 25 and between the earth electrode 332 and the bias electrode 35 can be prevented by forming the protrusions extending from the earth electrodes 232 and 332. Moreover, since the thicknesses of the earth electrodes 232 and 332, the contact areas between the earth electrodes 232 and 332 and the buffer layer 16, and the contact areas between the earth electrodes 231 and 331 and the buffer layer 16 are increased, high-frequency noise of the optical modulator in the ground potential can easily be propagated to the exterior via the earth electrodes. Thus, high-frequency transmission characteristics can be ensured.

Fifth Embodiment

FIG. 8 illustrates an optical modulator according to an embodiment of the present invention. For example, a substrate 11 is cut from a LN material along a direction parallel to the Z axis of the LN crystallographic axes, and an optical waveguide 12 is formed on the substrate 11 by thermal diffusion of a metal film composed of Ti or the like formed on the substrate 11. The Z-cut substrate 11 has a crystallographic axis enabling an efficient change in refractive index in a direction perpendicular to the surface thereof by means of an electro-optic effect. The optical waveguide 12 is of the Mach-Zehnder type including an entrance portion 121 to which light beams are input, a Y-shaped branch portion 122 for branching the light beams, parallel linear portions 123 and 124 that propagate the branched light beams, a Y-shaped branch portion 125 for multiplexing the light beams propagated through the linear portions 123 and 124, and an exit portion 126 from which the light beams are output.

A buffer layer 16, which has a thickness of 0.2 to 1 µm in general, is formed on the entire surface of the substrate 11 having the optical waveguide 12 formed thereon.

A signal electrode 44 is formed on the buffer layer 16 above the linear portion 123, and an earth electrode 432 is formed on the buffer layer 16 above the linear portion 124. An earth electrode 431 is formed so as to be symmetrical to the earth electrode 432 about the signal electrode 44. A bias electrode 45 is formed on the substrate 11 adjacent to the linear portion 124 on a side of the linear portion 124 opposite to that on which the signal electrode 44 is formed, and the buffer layer 16 is disposed on the bias electrode 45. The earth electrode 432 formed on the buffer layer 16 above the bias electrode 45 has a ladder shape having the bias electrode 45 interposed between the two long portions of the ladder and disposed under the crosspiece portions.

The signal electrode 44 is connected to an RF signal source 17 that generates modulating signals. The bias electrode 45 is connected to a power source 18, and controls the phases of the light beams propagated through the linear portions 123 and 124 by controlling an operating point (DC bias voltage) of the modulating signals generated by the RF signal source 17.

A ground potential is applied to the earth electrodes 431 and 432.

FIGS. 9A and 9B are cross-sectional views of the optical modulator taken along line A-B in FIG. 8 and taken along line A'-B' in FIG. 8, respectively.

For example, the substrate 11 is cut from an LN material having an electro-optic effect in the direction parallel to the Z axis of the LN crystallographic axes, and the pair of linear portions 123 and 124 of the Mach-Zehnder optical waveguide is formed on the substrate 11. The buffer layer 16 is disposed on the substrate 11 having the linear portions 123 and 124 formed thereon.

The signal electrode 44 is formed on the buffer layer 16 above the linear portion 123, and the earth electrode 432 is formed on the buffer layer 16 above the linear portion 124. The earth electrode 431 is formed so as to be symmetrical to the earth electrode 432 about the signal electrode 44. The bias electrode 45 is formed on the substrate 11 adjacent to the linear portion 124 on a side of the linear portion 124 opposite to that on which the signal electrode 44 is formed, and the buffer layer 16 is disposed on the bias electrode 45.

The cross-sectional view shown in FIG. 9A illustrates a portion where the earth electrode 432 does not have a crosspiece portion, and the earth electrode 432 is formed at either side of the bias electrode 45.

The cross-sectional view shown in FIG. 9B illustrates a portion where the earth electrode 432 has a crosspiece portion, and the earth electrode 432 is formed above the bias electrode 45.

According to this embodiment, the signal electrode and the bias electrode can be formed in a direction perpendicular to the extending direction of the pair of linear portions of the optical waveguide. Thus, the optical modulator can be reduced in size, and short-circuit between the signal electrode and the bias electrode can be regulated. Moreover, since the cross-sectional area of the earth electrode can be increased due to the ladder shape thereof, high-frequency noise of the optical modulator in the ground potential can easily be propagated to the exterior via the earth electrodes. Thus, high-frequency transmission characteristics can be ensured.

A reduction in the width of the crosspiece portions of the ladder-shaped earth electrode 432 is effective in preventing short-circuit between the earth electrode 432 and the bias electrode 45.

Sixth Embodiment

FIGS. 10A and 10B are cross-sectional views of the optical modulator taken along line A-B in FIG. 8 and taken along line A'-B' in FIG. 8, respectively.

The optical modulator shown in FIGS. 10A and 10B has a buffer layer 16 whose thickness on a bias electrode 45 is the same as that in other regions.

According to this embodiment, the short-circuits between the bias electrode 45 and crosspiece portions of a ladder-shaped earth electrode 432 can be further prevented. Moreover, the short-circuits between the bias electrode 45 and the crosspiece portions of the ladder-shaped earth electrode 432 can be further prevented by covering the bias electrode 45 with an insulating material.

Seventh Embodiment

FIG. 11 illustrates an optical modulator according to an embodiment of the present invention.

FIGS. 12A and 12B are cross-sectional views of the optical modulator taken along line A-B in FIG. 11 and taken along line A'-B' in FIG. 11, respectively.

For example, a substrate 51 is cut from a LN material along a direction parallel to the Z axis of the LN crystallographic axes, and an optical waveguide 12 is formed on the substrate 51 by thermal diffusion of a metal film composed of Ti or the like formed on the substrate 51. The Z-cut substrate 51 has a crystallographic axis enabling an efficient change in refractive index in a direction perpendicular to the surface thereof by means of an electro-optic effect. The optical waveguide 12 is of the Mach-Zehnder type including an entrance portion 121 to which light beams are input, a Y-shaped branch portion 122 for branching the light beams, parallel linear portions 123 and 124 that propagate the branched light beams, a Y-shaped branch portion 125 for multiplexing the light beams propagated through the linear portions 123 and 124, and an exit portion 126 from which the light beams are output.

The substrate 51 has grooves 511, 512, 513, and 514 whose both ends are tapered so as to reduce optical loss. These grooves can be formed by patterning and etching.

A buffer layer 56, which has a thickness of 0.2 to 1 μm in general, is formed on the surface of the substrate 51 having the optical waveguide 12 and the grooves 511 to 514 formed thereon. The buffer layer 56 is also formed on the side surfaces of the grooves 511, 512, 513, and 514 so as to reduce optical scattering loss caused by the roughness of the side surfaces. It is preferable that the thickness of the buffer layer 56 be larger than the above-described thickness, and be set to, for example, 0.4 to 1.5 μm.

A signal electrode 54 is formed on the buffer layer 56 above the linear portion 123, and an earth electrode 532 is formed on the buffer layer 56 above the linear portion 124. An earth electrode 531 is formed so as to be symmetrical to the earth electrode 532 about the signal electrode 54. Moreover, a bias electrode 55 is formed on the substrate 11 in the groove 511 adjacent to the linear portion 124 on a side of the linear portion 124 opposite that on which the signal electrode 54 is formed, and the buffer layer 56 is disposed on the bias electrode 55. The earth electrode 532 formed on the buffer layer 56 has a ladder shape having the bias electrode 55 interposed between the two long portions of the ladder. Moreover, the earth electrode 531 also has a ladder shape so as to maintain the symmetric property.

In this optical modulator of the coplanar type, the electrodes and grooves are disposed so as to be symmetrical about the signal electrode 54 as described above such that the electric field is efficiently applied to the linear portion 123 under the signal electrode 54.

The groove 511 is formed in an area where the bias electrode 55 is disposed, the groove 512 is formed between the pair of linear portions 123 and 124 of the optical waveguide 12, the groove 513 is formed adjacent to the linear portion 123, and the groove 514 is formed in an area of the crosspiece portions of the ladder-shaped earth electrode 531.

The signal electrode 54 is connected to an RF signal source 17 that generates modulating signals. The bias electrode 55 is connected to a power source 18, and controls the phases of the light beams propagated through the linear portions 123 and 124 by controlling an operating point (DC bias voltage) of the modulating signals generated by the RF signal source 17.

A ground potential is applied to the earth electrodes 531 and 532.

Since the bias electrode 55 is formed under the buffer layer 56, a through hole 561 is formed in a part of the buffer layer 56. The bias electrode 55 is extended to the surface of the buffer layer 56 via the through hole so as to be connected to a power source 18.

The optical modulator shown in FIGS. 11, 12A, and 12B has the ladder-shaped earth electrode 531 having the same ladder shape as the earth electrode 532 and the grooves 511, 512, 513, and 514 formed on the substrate 51 compared with the optical modulator according to the fifth embodiment shown in FIGS. 8, 9A, and 9B. The bias electrode 55 is formed in the groove 511.

The optical modulator according to this embodiment has the groove 511 and the bias electrode 55 formed therein. Thus, the short-circuits between the bias electrode 55 and the crosspiece portions of the ladder-shaped earth electrode 532 can be further prevented. Moreover, since the contact area between the earth electrode 531 and the buffer layer 56 is increased due to the ladder-shaped earth electrode 531, high-frequency transmission characteristics can easily be ensured.

Moreover, due to the grooves 511, 512, 513, and 514, electric fields can be efficiently applied to the linear portions 123 and 124 of the optical waveguide. Moreover, the symmetric property of the earth electrodes 531 and 532 about the signal electrode 54 is improved, and an electric field can be applied to the linear portion 123 under the signal electrode 54 more efficiently due to the grooves 511, 512, 513, and 514 formed so as to be symmetrical about the signal electrode 54 in the same manner.

Eighth Embodiment

FIG. 13 illustrates an optical modulator according to an embodiment of the present invention. For example, a substrate 61 is cut from a LN material along a direction parallel to the Z axis of the LN crystallographic axes, and a polarization-reversed region 62 where the polarization is reversed is partly formed on the substrate 61. An optical waveguide 12 is formed on the substrate 61 by thermal diffusion of a metal film composed of Ti or the like formed on the substrate 61. The Z-cut substrate 61 has a crystallographic axis enabling an efficient change in refractive index in a direction perpendicular to the surface thereof by means of an electro-optic effect. The optical waveguide 12 is of the Mach-Zehnder type including an entrance portion 121 to which light beams are input, a Y-shaped branch portion 122 for branching the light beams, parallel linear portions 123 and 124 that propagate the branched light beams, a Y-shaped branch portion 125 for multiplexing the light beams propagated through the linear portions 123 and 124, and an exit portion 126 from which the light beams are output.

The polarization-reversed region 62 is arranged such that both the polarization-reversed region 62 and polarization-unreversed regions are disposed in the area where the linear portions 123 and 124 of the optical waveguide 12 are formed.

A signal electrode 64 extending above both the linear portions 123 and 124 is formed on a buffer layer 66.

Earth electrodes 631 and 632 are formed on the buffer layer 66 above the linear portions 123 and 124, respectively. The earth electrodes 631 and 632 are formed so as to each have a ladder shape such that the contact areas between the earth electrodes 631 and 632 and the buffer layer 66 are increased, thus increasing the cross-sectional areas of the earth electrodes.

The signal electrode 64 is connected to an RF signal source 17 that generates modulating signals.

With this structure, an electric field generated by the modulating signals applied to the signal electrode 64 is applied to the linear portions 123 and 124, and the refractive indices in the polarization-reversed region 62 and the polarization-unreversed regions are changed in such a manner that if the refractive index in the polarization-reversed region 62 is increased then the refractive index in the polarization-unreversed region is decreased and vice-versa.

Bias electrodes 651 and 652 are formed adjacent to the linear portions 124 and 123, respectively, so as to control the phases of the light beams propagated through the linear portions 123 and 124 by controlling the operating point (DC bias voltage) of the modulating signals generated by the RF signal source 17 at both the linear portions 123 and 124. Moreover, the bias electrodes 651 and 652 are formed in grooves 611 and 612, respectively, formed in the polarization-reversed region 62 on the substrate 61. Since the bias electrodes 651 and 652 disposed in the grooves 611 and 612, respectively, are formed under the buffer layer 66, the bias electrodes 651 and 652 are extended to the surface of the buffer layer 66 via through holes 661 and 662 formed in the buffer layer 66. The bias electrodes 651 and 652 are connected to a bias electrode 65 on the surface of the buffer layer 66, and then connected to a power source 18.

According to this embodiment, the substrate having the polarization-reversed region is a Z-cut substrate, and thus an electric field can be effectively applied to the pair of linear portions of the optical waveguide by the signal electrode, the earth electrodes, and the bias electrodes. Moreover, changes in the phases of the light beams propagated through the pair of linear portions of the optical waveguide reverse in sign and the absolute values become equal to each other. Therefore, the signal electrode and the bias electrodes can be formed in the direction perpendicular to the extending direction in the pair of linear portions of the optical waveguide also in chirp-free optical modulators, and thus the size of the modulators can be reduced. Moreover, since the cross-sectional areas of the earth electrodes are increased by the ladder-shaped earth electrodes, high-frequency noise of the optical modulator in the ground potential can easily be propagated to the exterior via the earth electrodes. Thus, high-frequency transmission characteristics can be ensured.

Figure 14B:
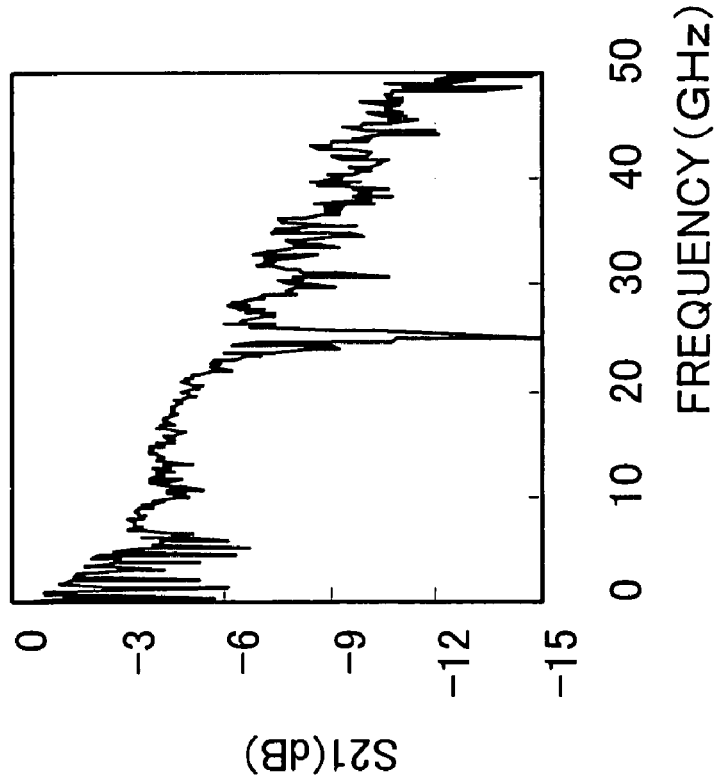
FIGS. 14A and 14B illustrate the high-frequency characteristics of optical modulators.
Figure 14A:
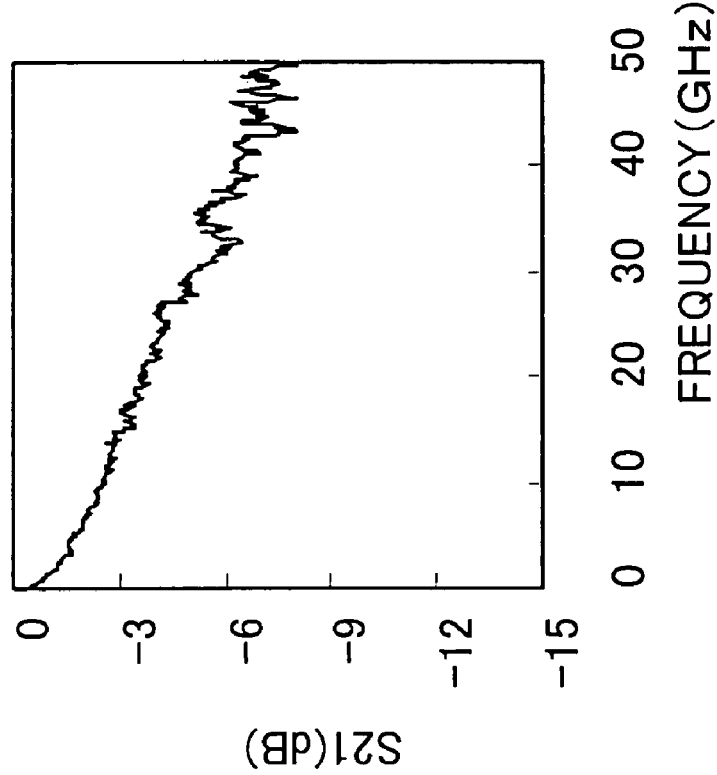

FIGS. 14A and 14B illustrate the high-frequency characteristics of optical modulators. The abscissa represents signal frequency, and the ordinate represents attenuation S21 of light signals traveling from the input side to the output side. FIG. 14B illustrates the frequency characteristics when less ground current is passed, and FIG. 14A illustrates the frequency characteristics when the above-described earth electrodes are employed. With the above-described earth electrodes, wideband characteristics can be ensured.

In the fifth embodiment or later having the ladder-shaped earth electrodes such as the earth electrode 432 shown in FIG. 8 and the earth electrode 532 shown in FIG. 11, the effect of grounding in a wide frequency band is enhanced when the cross-sectional width of the earth electrode on the linear portion of the optical waveguide (for example, w1 in FIG. 9A) is smaller than that of the other earth electrode (for example, w2 in FIG. 9A). Moreover, the short-circuits between the bias electrodes and the earth electrodes can be regulated more reliably when the interval between the crosspiece portions of the ladder-shaped earth electrodes (for example, S in FIG. 8) is increased and the cross-sectional width of the crosspiece portions (for example, P in FIG. 8) is reduced. However, in order to ensure high-frequency characteristics in ultra-fast optical modulators having a speed of, for example, 40 Gbits/s, it is preferable that the interval between the crosspiece portions of the ladder-shaped earth electrodes be 10 mm or less, and the cross-sectional width of the crosspiece portions be 5 μm or more.

What is claimed is:

1. An optical modulator of Mach-Zehnder type comprising:
   a substrate having a pair of optical waveguides formed therein;
   a signal electrode, formed on the substrate above one of the pair of optical waveguides, applying modulation signals that modulates light propagated over the optical waveguides;
   first and second earth electrodes, formed at either side of the signal electrode on the substrate, applying a ground potential, the first earth electrode being disposed above the other of the pair of optical waveguides; and
   a bias electrode, formed on the substrate adjacent to the first earth electrode on the opposite side of the signal electrode, applying a bias signal that controls an operation point for the modulation signal,
   wherein the thickness of the first earth electrode is greater than the thickness of the signal electrode, and the signal electrode, the first and second earth electrodes, and the bias electrode extend in parallel with one another along the optical waveguide.

2. An optical modulator of Mach-Zehnder type comprising:
- electrodes disposed above a substrate on which a pair of optical waveguide is formed;
- wherein the electrodes comprises
- a signal electrode to which modulation signals, for modulating light propagated over the optical waveguides, are applied;
- first and second earth electrodes to which a ground potential is applied; and
- a bias electrode to which a bias signal, for controlling an operation point for the modulation signals, is applied,
- wherein the signal electrode is disposed above the one of the pair of optical waveguides;
- the first and second earth electrodes are disposed at either side of the signal electrode, and the first earth electrode is disposed above the other of the pair of optical waveguides;
- the bias electrode is disposed adjacent to the first earth electrode on the opposite side of the signal electrode disposed;
- the bias electrode is disposed on a surface of the substrate; and
- the first earth electrode is disposed on a buffer layer formed on the surface of the substrate, and is shaped into a ladder,
- wherein crosspiece portions of the ladder are above the bias electrode.

3. The optical modulator according to claim 1, wherein the first electrode comprises a plurality of protrusions extending toward the bias electrode, and the bias electrode partly protrudes to areas between the protrusions.

4. The optical modulator according to claim 3, wherein adjacent pairs of the protrusions are connected to each other with metal wires above the bias electrode.

5. The optical modulator according to claim 2, wherein the substrate comprises
- a first groove disposed in an area of the substrate where the bias electrode is to be formed;
- a second groove disposed in an area of the substrate between the pair of the optical waveguide; and
- a third groove disposed in an area of the substrate adjacent to the signal electrode on an opposite side of the second groove disposed;
- wherein the bias electrode is disposed in the first groove.

6. The optical modulator according to claim 2, wherein a cross-sectional width of one of the two long portions of the ladder-shaped first earth electrode that isn't disposed above the optical waveguide is larger than the cross-sectional width of the other.

7. The optical modulator according to claim 2, wherein an interval between the crosspiece portions of the ladder-shaped first earth electrode is 10 mm or less.

8. The optical modulator according to claim 2, wherein a cross-sectional width of the crosspiece portions of the ladder-shaped first earth electrode is 5 μm or more.

9. The optical modulator according to claim 1, wherein the substrate is a Z-cut substrate.

10. The optical modulator according to claim 2, wherein the substrate is a Z-cut substrate.

11. The optical modulator according to claim 1, wherein the substrate is composed of lithium niobate($LiNbO_3$).

12. The optical modulator according to claim 2, wherein the substrate is composed of lithium niobate($LiNbO_3$).

13. An optical modulator of Mach-Zehnder type comprising:
- a substrate having an electro-optic effect; and
- electrodes disposed above the substrate on which a pair of optical waveguides is formed;
- wherein a part of the substrate where one of the optical waveguides is formed, is polarization inverting area; and
- wherein the electrodes comprise
- a signal electrode to which modulation signals, for modulating light propagated over the optical waveguides, are applied;
- earth electrodes to which a ground potential is applied; and
- a bias electrode to which a bias signal, for controlling an operation point for the modulation signals, is applied,
- wherein the earth electrode is shaped into a ladder with the bias electrode being disposed under the crosspiece portions of the ladder.

* * * * *